(12) United States Patent
Kardohely

(10) Patent No.: US 8,922,451 B2
(45) Date of Patent: Dec. 30, 2014

(54) LOCKDOWN MECHANISM FOR AN ELECTRIC DRIVE SCREW TELESCOPING MAST SYSTEM

(75) Inventor: Michael James Kardohely, West Salem, OH (US)

(73) Assignee: The Will-Burt Company, Orrville, OH (US)

( * ) Notice: Subject to any disclaimer, the term of this patent is extended or adjusted under 35 U.S.C. 154(b) by 128 days.

(21) Appl. No.: 13/013,037

(22) Filed: Jan. 25, 2011

(65) Prior Publication Data
US 2012/0189376 A1 Jul. 26, 2012

(51) Int. Cl.
*H01Q 1/10* (2006.01)
*E04H 12/18* (2006.01)
*H01Q 1/12* (2006.01)
*F16B 7/10* (2006.01)

(52) U.S. Cl.
CPC ........... *E04H 12/182* (2013.01); *H01Q 1/1235* (2013.01); *F16B 7/105* (2013.01)
USPC ...................... 343/883; 403/109.3; 403/109.7

(58) Field of Classification Search
USPC .......... 403/109.1, 109.2, 109.3, 109.7, 322.1, 403/322.3, 324, 325, 328; 52/111, 632; 343/874, 875, 880, 883
See application file for complete search history.

(56) References Cited

U.S. PATENT DOCUMENTS

| | | | | |
|---|---|---|---|---|
| 2,708,493 A | * | 5/1955 | Badertscher et al. | 52/111 |
| 4,663,900 A | * | 5/1987 | Rehm et al. | 52/632 |
| 4,871,138 A | * | 10/1989 | Sauter | 52/118 |
| 5,218,375 A | * | 6/1993 | Hillman | 343/883 |
| 5,593,129 A | | 1/1997 | Adams et al. | |
| 5,624,046 A | * | 4/1997 | Zimmermann | 52/632 |
| 5,660,495 A | * | 8/1997 | Atsukawa | 403/377 |
| 7,497,140 B2 | | 3/2009 | Blackwelder et al. | |
| 2009/0110527 A1 | | 4/2009 | Kardohely | |
| 2009/0145056 A1 | | 6/2009 | Pereira | |
| 2010/0146873 A1 | | 6/2010 | Keller | |

FOREIGN PATENT DOCUMENTS

EP 0 192 094 * 1/1986 ............ F16B 7/10

* cited by examiner

*Primary Examiner* — Michael P Ferguson
(74) *Attorney, Agent, or Firm* — Fay Sharpe LLP

(57) ABSTRACT

This disclosure pertains to a lockdown mechanism for an electric drive screw telescoping mast. The lockdown mechanism comprising a plurality of elongated tube sections which are telescopingly attached to each other, each tube section comprising a substantially hollow body. An elongated drive screw is disposed within the hollow body and includes a plurality of threads for extending and retracting the elongated tube sections. A lock subassembly includes a housing and a center hub, the housing comprises a load bearing top and a hollow cavity, the lock subassembly being rigidly attached to said center tube and axially aligned along a central axis with said plurality of elongated tube sections. The center hub is movably engaged within the hollow cavity of the housing and includes at least one locking pin adapted to the center hub that is movably engaged to the structural envelope when the mast is in the lockdown position.

13 Claims, 6 Drawing Sheets

LOCKDOWN MECHANISM FOR AN ELECTRIC DRIVE SCREW TELESCOPING MAST SYSTEM

BACKGROUND

The present embodiment relates to a lockdown mechanism for use in telescoping mast systems and more particularly to a lockdown mechanism for an electric drive screw telescoping mast system. However, it is to be appreciated that the present exemplary embodiment is also amenable to other like applications.

Telescoping masts are utilized in many different capacities including civilian, industrial and military applications throughout the world. Quick erecting telescoping masts are particularly suited for applications wherever there is a need for portable masts requiring fast setup and teardowns with minimum power and effort. In addition to numerous military applications, including target acquisitions, surveillance and field communications, quick erecting telescoping masts are utilized commercially to support a wide variety of antennas elevated testing equipment, floodlights and cameras. Free standing masts can be installed on a wide variety of vehicles and shelters.

Generally, the body of the mast includes a series of tubes that typically comprise cylindrical shaped bodies, each having a generally hollow interior wherein each cylinder is axially adjacent and interconnected with a passage for communication therethrough. Each tube generally has a flanged lip radially disposed away from a central axis at a bottom end and a flanged lip radially disposed toward the axis at a top end. The tubes concentrically engage one another wherein the exterior tube has a width greater than a first intermediate tube disposed therein. The first intermediate tube having a greater width than a second intermediate tube disposed therein and so on. This arrangement can comprise any number of tubes wherein the pinnacle of the mast includes a top or center tube having a width that is smaller than any other tube in the mast. The top tube is attached to the load intended to be deployed and/or retracted.

Telescoping masts are known to be automated using hydraulic, pneumatic, chain driven or axial screw driven arrangements. Particularly, an axial drive screw is centrally located in the mast assembly for extending and retracting a plurality of elongated tubes to any position between a fully nested position and a fully extended position. A base ring and a threaded nut are secured to a bottom portion of each of the plurality of elongated tubes respectfully. The threaded nuts include internal threads and engage corresponding threads on the drive screw wherein rotation of the drive screw acts to extend or retract the plurality of elongated tubes by mechanical force.

However, most telescoping mast systems experience some difficulty during transport because of shock or vibration as there may be some loose parts within the system. An associate user must remove the payload from the top of the mast prior to transport to avoid risking damage therein and to lock the otherwise loose parts in place. This step becomes time consuming for the user and prevents rapid and efficient use of the telescoping mast system.

Therefore, there is a need to provide an automatic locking support member for a telescoping mast system to eliminate the need for the user to remove the payload and lock down the mast after use. There is also a need to provide a mast system that is able to survive increased shock and vibration exposure especially in vehicle mounted systems.

BRIEF DESCRIPTION

In one embodiment, a lockdown mechanism for a telescoping mast is provided. The lockdown mechanism comprising a plurality of elongated tube sections which are telescopingly attached to each other including at least a center tube, each tube section comprising a substantially hollow body. A lock subassembly includes a housing and a load bearing top, the lock subassembly being rigidly attached to said center tube and axially aligned with said plurality of elongated tube sections. The lock subassembly is at least partially inserted into the structural envelope when the elongated tub sections are in a nesting position. At least one locking pin is moveably adapted to engage the structural envelope and the lock subassembly when the mast is in the lockdown position.

In another embodiment, there are four locking pins that engage the housing and the structural envelope while remaining perpendicular to the central axis. The four locking pins are equally spaced from one another and radially extended from the center hub. Each locking pin is pinned to a first end of a linkage member and the center hub is pinned to a second end of the linkage member. In the extended position, the lock subassembly becomes at least partially disengaged from the structural envelope when the center tube is at least partially extended.

In yet another embodiment, an elongated drive screw is disposed within a hollow body of the center tube section. The drive screw is provided with a plurality of threads for extending and retracting the elongated tube sections to any position between a lockdown position and an extended position. A center hub translates about the drive screw within the housing and is axially moved towards the load bearing top while the locking pins disengage and move away from the structural envelope. Conversely, as the center hub is moved away from the load bearing top, the locking pins move towards the structural envelope and become moveably engaged.

The center tube comprises a base nut at a first end of the center tube and a threaded nut and carrier adapter at a second end of the center tube, the base nut and the threaded nut being positioned along the central axis to be threadedly engaged by the drive screw wherein rotation of the drive screw extends or retracts the center tube.

The carrier adapter comprises an elongated cylindrical body having a hollow interior adapted for translation of the drive screw. The threaded nut is adapted to a first side of the carrier adapter, while the center hub is adapted to a second side of the carrier adapter. A resilient member is provided within the housing to urge said center hub towards the load bearing top.

Upon rotation of said drive screw, the plurality of threads disposed longitudinally along the drive screw engage the threaded nut at an engagement point and disengage the base nut at a bottom end of the drive screw wherein the threaded nut and the drive screw substantially support the center tube until the lock subassembly abuts the structural envelope. The drive screw continues to rotate after the housing abuts the structural envelope wherein the drive screw urges the center hub away from the load bearing top causing the locking pins to moveably engage the structural envelope. Further, a support bracket is adapted to the structural envelope and an associate rigid structure to provide structural support to the telescoping mast system while the plurality of elongated tubes is in the nested position.

In another embodiment, a method of locking down an electric drive screw telescoping mast is provided. The method comprises providing a plurality of elongated tubes powered by an elongated drive screw. Rotating the elongated drive screw to retract the plurality of elongated tubes to a nesting position. Positioning a lock subassembly on a top rim of a structural envelope, the lock subassembly located on a top end of the plurality of elongated tubes, the structural envelope substantially surrounds the plurality of elongated tubes. Urging a center hub away from a load bearing top, the center hub is located within the lock subassembly and moveably engaged to at least one locking pin, the load bearing top is positioned on the lock subassembly opposite the plurality of elongated tubes. Engaging the structural envelope with at least one locking pin.

An advantage of the present disclosure is a mechanism that automatically locks down a plurality of elongated tubes in a nesting position to prevent shock and vibration loads induced by a mast payload during transport of the telescoping mast on a host vehicle.

Another advantage of the present disclosure provides a mechanism that does not require the removal of a mast payload to lock down the plurality of elongated tubes in the nesting position.

Yet another advantage of the present disclosure relates to a method of locking down a telescoping mast system.

Still other features and benefits of the present disclosure will become apparent from the following detailed description.

DETAILED DESCRIPTION

It is to be understood that the detailed figures are for purposes of illustrating exemplary embodiments only and are not intended to be limiting. Additionally, it will be appreciated that the drawings are not to scale and that portions of certain elements may be exaggerated for the purpose of clarity and ease of illustration.

In accordance with the present disclosure, a mechanism and method are provided to automatically lock down a telescoping mast system in a nesting position. This locking mechanism and method helps to prevent shock, vibration and damage to a plurality of elongated tubes and an associated payload during transport of the telescoping mast.

Figure 1:
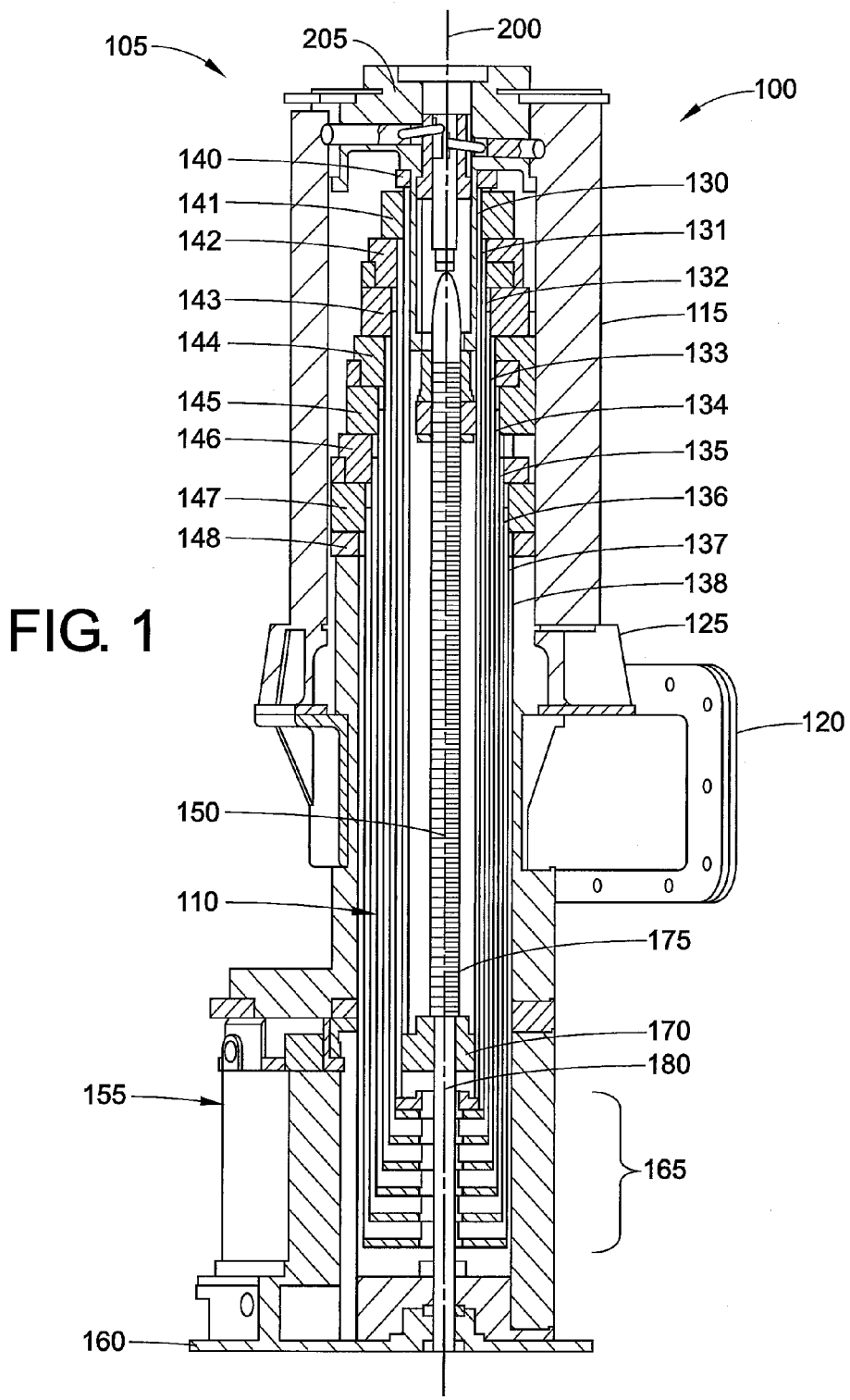
FIG. 1 is a cross sectional view of the electric drive screw telescoping mast system in a nesting position.

With reference to FIG. 1, a drive screw telescoping mast system 100 is shown in a nesting position 105. The mast system 100 comprises a plurality of axially adjacent interconnecting and elongated tube sections 110. The nesting position 105 for a telescoping mast defines when the plurality of elongated tube sections 110 can be fully retracted in a compressed arrangement. Each of the interconnected mast sections may be a substantially cylindrical tube; however, other shapes can be utilized for like applications. Although eight elongated tube sections 130-138 are illustrated, it is within the scope of the present disclosure to incorporate any number as desired.

An outermost mast section or structural envelope 115 covers the plurality of elongated tube sections and comprises a substantially hollow and cylindrical shape. However, the shape of structural envelope 115 may be any elongated geometric arrangement. Structural envelope 115 comprises a structural material that can support an associate payload to be hoisted by the mast assembly. When operated, structural envelope 115 remains stationary relative to the plurality of elongated tube sections 110 and can be affixed to an associated structure such as a vehicle, ground surface or wall (not shown). The structural envelope 115 can be made from a variety of rigid materials that are capable of supporting dynamic loads. In one embodiment, the structural envelope 115 is made of aluminum.

A center tube section 130 is provided along a common axis 200 and at least partially within the structural envelope 115. The center tube section 130 is directly attached to a lock sub-assembly 205 which is located at a top side of mast assembly 100 and may be attached to any desired payload that is supported by the assembly.

Each of the plurality of elongated tubes 110 may be cylindrical tubes having substantially hollow bodies having outwardly extending cylindrical collars 140-148. Cylindrical collars 140-148 have a slightly larger diameter than an external diameter of the elongated tubes 130-138 respectively and provide a bearing surface between each tube. It should be noted that this disclosure does not limit the shape of elongated tube sections, cylindrical collars or structural envelope 115 as each may comprise an overall prismatic, rectangular, square or triangular type orientation. Each of the elongated tubes 110 has an upper end and a lower end with respect to the vertical orientation of the mast assembly in FIG. 1. The elongated tube sections range from the largest outer diameter base tube 138 to the smallest diameter center tube 130. The axially adjacent tubes of the mast assembly include cylindrical collars 140-148 comprising interengaging guide and stop components, which can be a latch and latch receiving assembly to structurally engage each axially adjacent tube during operation. The latch assemblies structurally support axially adjacent elongated tubes while in an extended position.

In one embodiment, the elongated tubes 110 are extended and retracted by means of a drive screw 150, which is rotated and controlled by a motor assembly 155. Elongated tube sections 130-138 are each provided with a base nut 165. The base nuts 165 are each located at a base end of the elongated tubes 110. Drive screw 150 and motor assembly 155 are mounted on a structural base 160 that also supports base tube 138. Drive screw 150 is substantially elongated and longitudinally disposed along common axis 200 within the hollow body of center tube 130. Drive screw 150 includes a plurality of threads 175 disposed substantially along an outer edge that is adapted to rotatably engage the plurality of base nuts 165 and a center base nut 170.

Center base nut 170 is located at the base end of center tube section 130 and disengages contact with the threads 175 along drive screw 150 while mast system 100 is in nesting position 105. Center base nut 170 and base nuts 165 are located at a smooth surface portion 180 of drive screw 150 while in nesting position 105. Smooth surface portion 180 does not include threads 175 and allows the drive screw 150 to turn while not engaging base nuts 165 or center base nut 170. Under this orientation, the cylindrical collars 140-148 are adapted to control sequential extension of the tubes. For example, as the center tube 130 approaches full extension due to the rotational and translational engagement of center base nut 170 to drive screw 150, the latches of cylindrical collar 140 engage the next largest latch from cylindrical collar 141 on elongated tube 131. Elongated tube 131 is now extended upwards until the base nut 165 from elongated tube 131 engages the threads 175 of drive screw 150. This nut is now in position to support a mast payload as the center base nut 170 disengages from threads 175 along a top portion of drive screw 150. However, while in the nesting position 105, the thread orientation of drive screw 150 of this embodiment allows the center base nut 170 to disengage from the threads 175 of drive screw 150 to be positioned adjacent the smooth surface portion 180.

In another embodiment, the structural envelope 115 can include a support bracket 120 or chassis for attachment to an associate structure such as a vehicle, ground surface or wall. The support bracket 120 is rigidly adapted to structural envelope 115 at a base end 125 to allow the transfer of a load supported by elongated tube sections 110 in an extended position 280 to be supported by structural envelope 115 and ultimately the chassis when in a lockdown position 210. Also, a lock subassembly 205 is automatically pinned to structural envelope 115 to transfer loads supported by the mast assembly 100 from center base nut 170 along drive screw 150 to the structural envelope 115.

Figure 2:
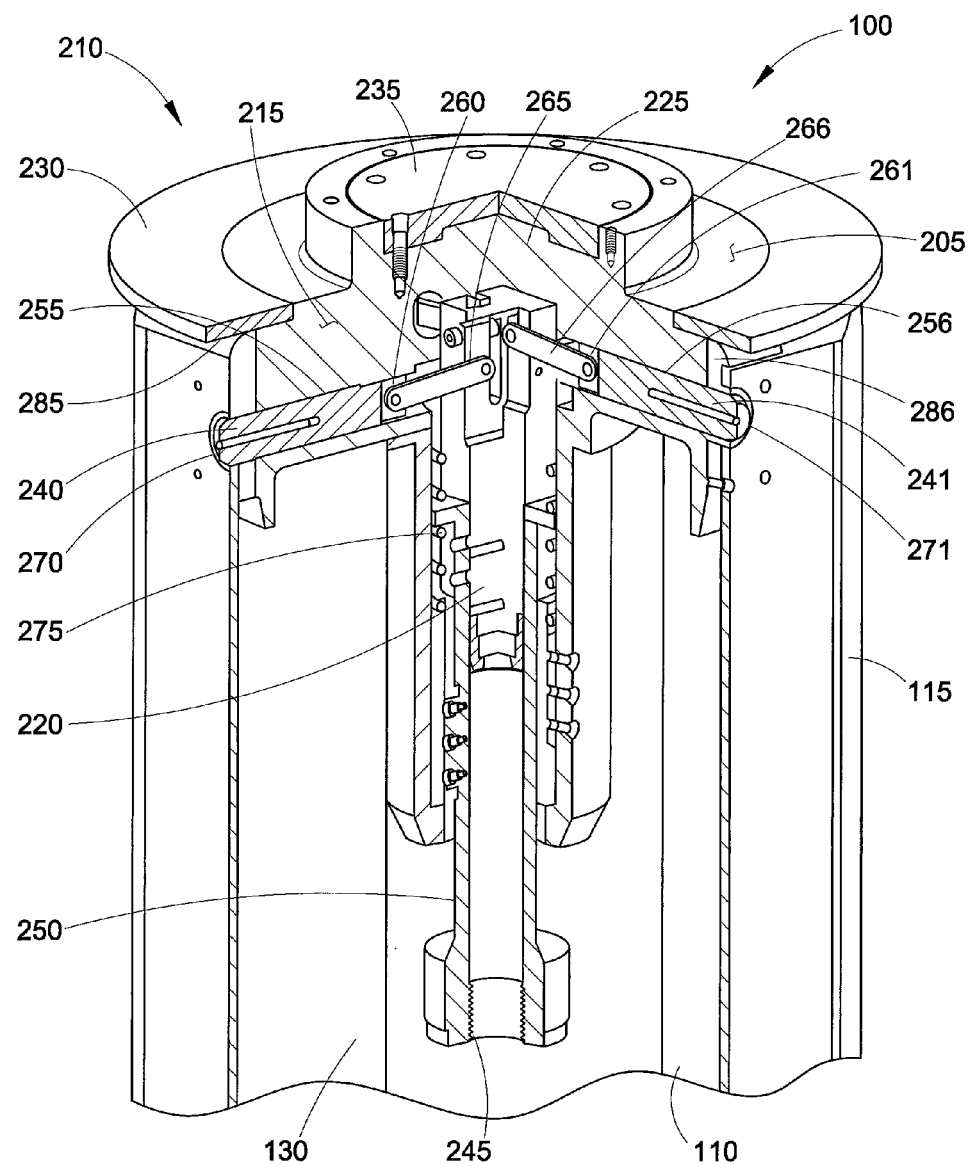
FIG. 2 is a partial exploded perspective cross sectional view of the lockdown mechanism in a locked position.

With further reference to FIGS. 2-5, the lock subassembly 205 is depicted in a plurality of positions including at least a locked down position 210, the nesting position 105 and an extended position 280. FIG. 2 shows the lock sub-assembly 205 the locked down position 210. Here, lock subassembly 205 is rigidly attached to the top portion of center tube 130 and comprises a housing 215 and a center hub 220. The lock subassembly 205 is axially aligned along the common axis 200 with the plurality of elongate tube sections 110, the drive screw 150 and the structural envelope 115. The housing 215 having a cavity 225 opposite a load bearing top 235 and a reinforcement ring 230 whereby the central hub 220 is at least partially displaced within the cavity 225. Notably, the lock sub-assembly 205 may be adapted to any type of telescoping mast system such as drive screw, hydraulic or pneumatic types.

Reinforcement ring 230 serves as a payload interface and also supports a payload as the plurality of elongated tubes 110 transitions from extended position 280 to nesting position 105 and further to the lockdown position 210. The center hub 220 is moveably engaged within cavity 225 and is linkably engaged to the at least one locking pin 240, 241 that is adapted to movably engage or disengage from the structural envelope 115 when the mast assembly 100 is in the nesting position 105.

In this embodiment, locking pins 240, 241 comprise a structural material that can be formed into an elongated cylindrical body and adapted within pathways 255, 256 of housing 215 to radially translate in a direction perpendicular to common axis 200. O-rings or gaskets may be provided between pathways 255, 256 and locking pins 240, 241 to prevent unwanted dirt and moisture contamination. Distal ends 260, 261 of locking pins 240, 241 are attached to a first end of link members 265, 266. A second end of link members 265, 266 can be operably attached to central hub 220 whereby as the central hub 220 is moved away from load bearing top 235, the locking pins 240, 241 move or translate toward the structural envelope 115. The locking pins 240, 241 can engage the structural envelope 115 at an aperture 270, 271 to place the locking subassembly 210 in the lockdown position. Locking pins 240, 241 can share a common radial plane or can be axially or angularly displaced from each other along common axis 200.

As can be appreciated, the nesting position is recognized when the reinforcement ring 230 engages the structural envelope 115 whereby the plurality of pathways 255, 256 can be aligned with the apertures 270, 271. At least one structural insert 285, 286 may be adapted to structural envelope 115 at apertures 270, 271 to provide additional structural support. Further, structural inserts 285, 286 can be adapted to engage reinforcement ring 230 while the mast assembly 100 is in the nesting position 105.

The lock sub-assembly 205 is in lockdown position 210 when the locking pins are positioned at least partially within apertures 270, 271 thereby structurally engaging lock subassembly 205 to structural envelope 115. Further, lock subassembly 205 is properly aligned with apertures 270, 271 as the plurality of elongated tubes 110 are retracted to nesting position 105.

In another embodiment, the lock sub-assembly 205 may further comprise a threaded nut 245 and a carrier adapter 250. The carrier adapter 250 comprises an elongated cylindrical body having a hollow interior adapted for translation with the drive screw 150. The carrier adapter 250 houses the threaded nut 245 at a first side and rigidly engages center hub 220 at a second side whereby the second side is opposite the first side. Notably, the center hub 220 and carrier adapter 250 are positioned along common axis 200 and located within at least a portion of cavity 225. The carrier adapter 250 may be keyed or locked to prevent rotation relative to the drive screw 150. At least one resilient member 275 provides a constant force between the housing 225 and the center hub 220 to urge the center hub 220 towards the load bearing top 235. The resilient member 275 may be oriented in any way to forcefully urge the center hub 220 towards the load bearing top 235. The resilient member 275 is indicated to be a spring but any type resilient member known in the art is covered by this system.

In another embodiment, the locking pins 240, 241 may be spring loaded to translate toward and away from the structural envelope 115. In a further embodiment, an actuator may be utilized to drive the locking pins 240, 241 with a separate pneumatic, hydraulic or electric power source.

Figure 3:
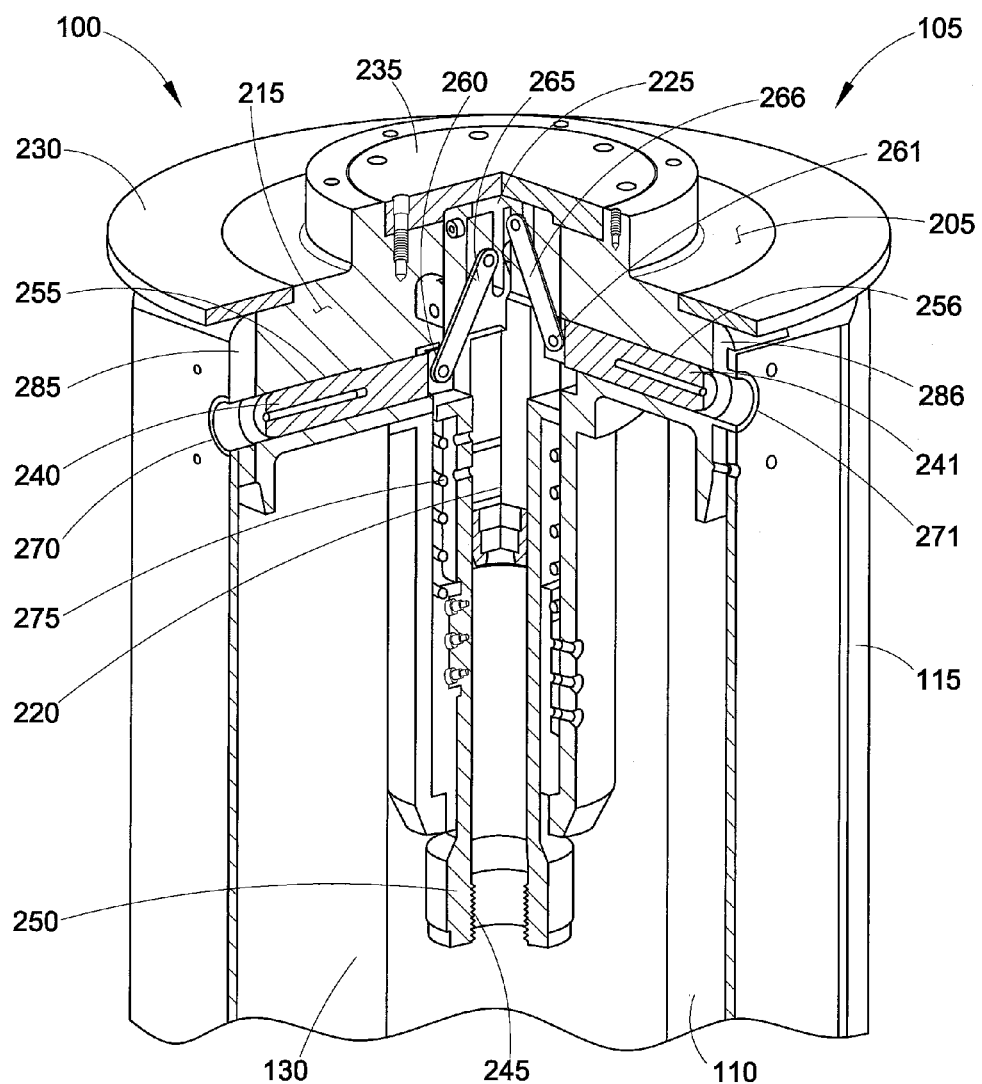
FIG. 3 is a partial exploded perspective cross sectional view of the lockdown mechanism in a nesting position and unlocked.

Turning to FIG. 3, the lock sub-assembly 205 is depicted in the nesting position 105. Here, center hub 220 is positioned adjacent to load bearing top 235 within the cavity 225 of housing 215. The reinforcement ring 230 is positioned on the structural envelope 115 whereby a load transfer occurs from the drive screw 150 and plurality of elongated tubes 110 in the expanded position to the reinforcement ring 230 and structural envelope 115 in the nesting position 105.

Figure 4:
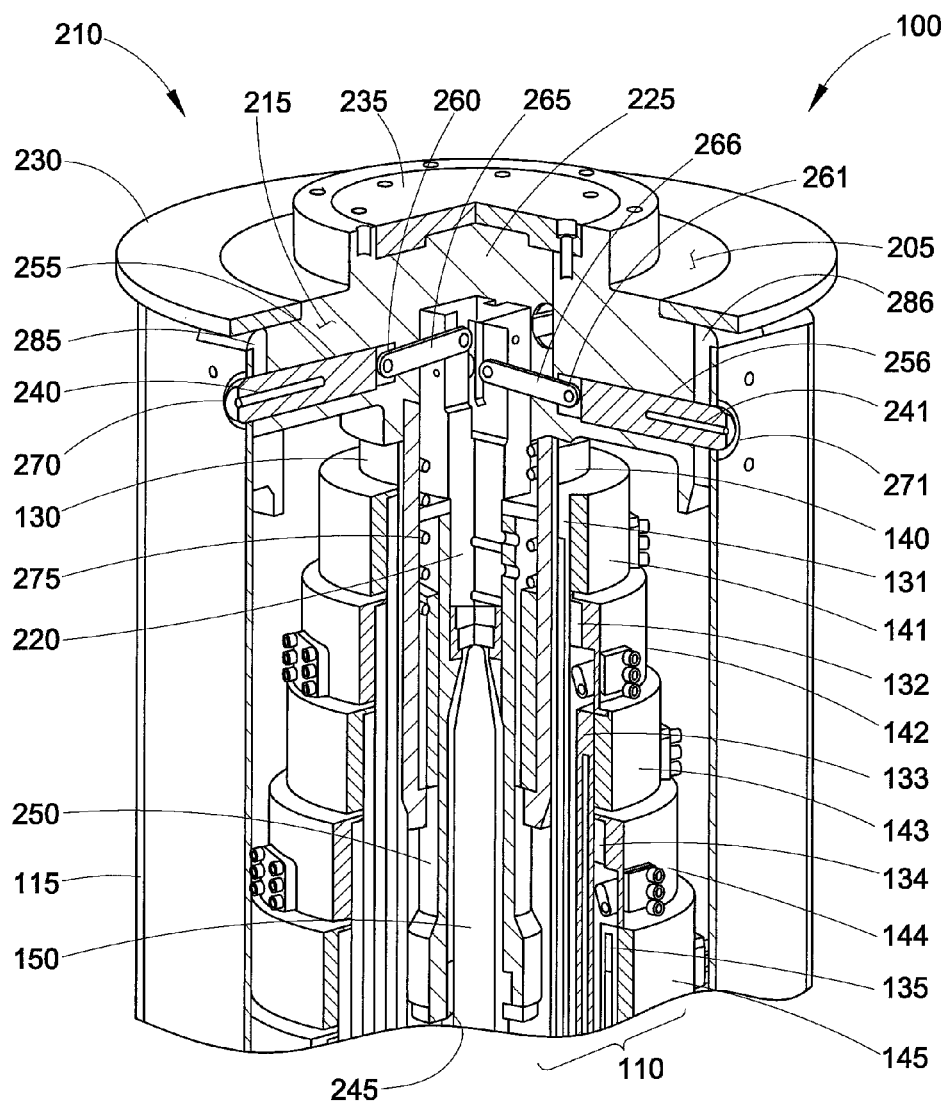
FIG. 4 is a partial exploded perspective cross sectional view of the electric drive screw telescoping mast system in a nesting and locked position.

In FIG. 4, lock sub-assembly 205 is depicted in the lockdown position 210. Here, when the mast assembly 100 is activated, drive screw 150 rotates and engages the threaded nut 245 of carrier adapter 250. Carrier adapter 250 translates along threads 175 of drive screw 150 to axially displace center hub 220 from the load bearing top 235 within the cavity 225 of housing 215. The drive screw 150 pulls the carrier adapter 250 and the center hub 220 thereby compressing the resilient member 275 and causing at least one of the locking pins 240, 241 to movably engage apertures 270, 271 at the structural envelope 115. However, prior to this position, the base nut 170 of center tube 130 passes off the threads 175 of drive screw 150 and is positioned about smooth surface portion 180. After the base nut 170 passes off the bottom of the threads 175 of drive screw 150, the lock sub-assembly 205 continues to lower the center tube 130 until the reinforcement ring 230 contacts the structural envelope 115 at the structural inserts 285, 286. At this point, the associate payload is supported by the structural inserts 285, 286, and the structural envelope 115, and the continued rotation of the drive screw 150 in the same direction moves the center hub 220 down relative to the load bearing top 235 as the resilient member 275 compresses. The downward motion of center hub 220 drives locking pins 240, 241 outward and engage structural inserts 285, 286 about apertures 270, 271 respectfully. The extent of motion can be controlled by counting screw revolutions or by a timer in control software. An elastomeric bumper (not shown) can also be provided to protect the drive screw 150 and provide a secondary stop via motor stall/current limiting.

Figure 5:
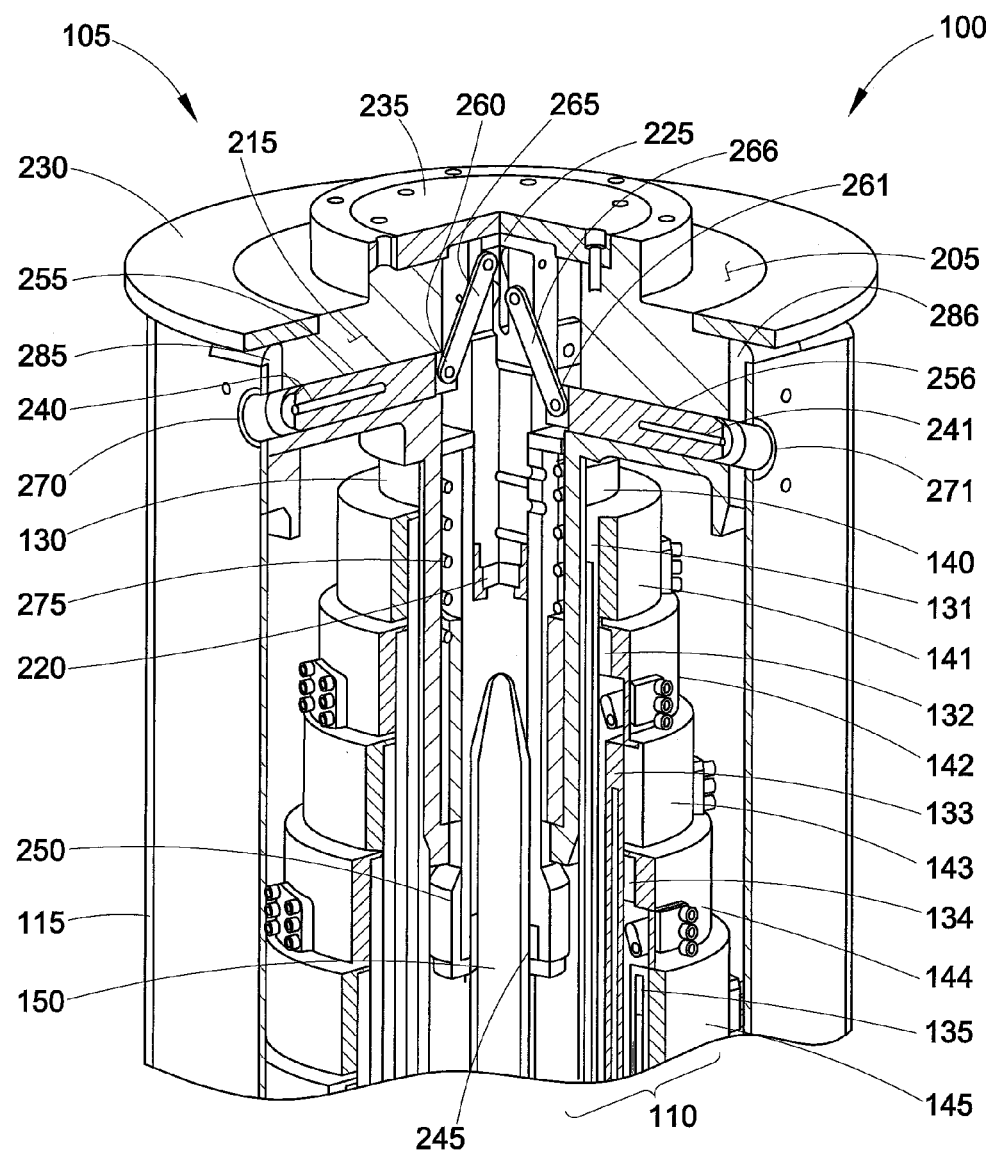
FIG. 5 is a partial exploded perspective cross sectional view of the electric drive screw telescoping mast system in a nested and unlocked position.

For extension of the mast assembly 100, the sequence is reversed. When the drive screw 150 is rotated in the opposite direction, the carrier adapter 250 and center hub 220 are urged towards the load bearing top 235 within the cavity 225 of the housing 215 thereby disengaging at least one of the locking pins 240, 241 from structural envelope 115 and placing the lock sub-assembly 205 in the nesting position 105 as depicted in FIG. 5. Here, the center hub 220 engages the load bearing top 235 and begins lifting or axially displacing the reinforcing ring 230 away from the structural envelope 115 and structural inserts 285, 286.

Figure 6:
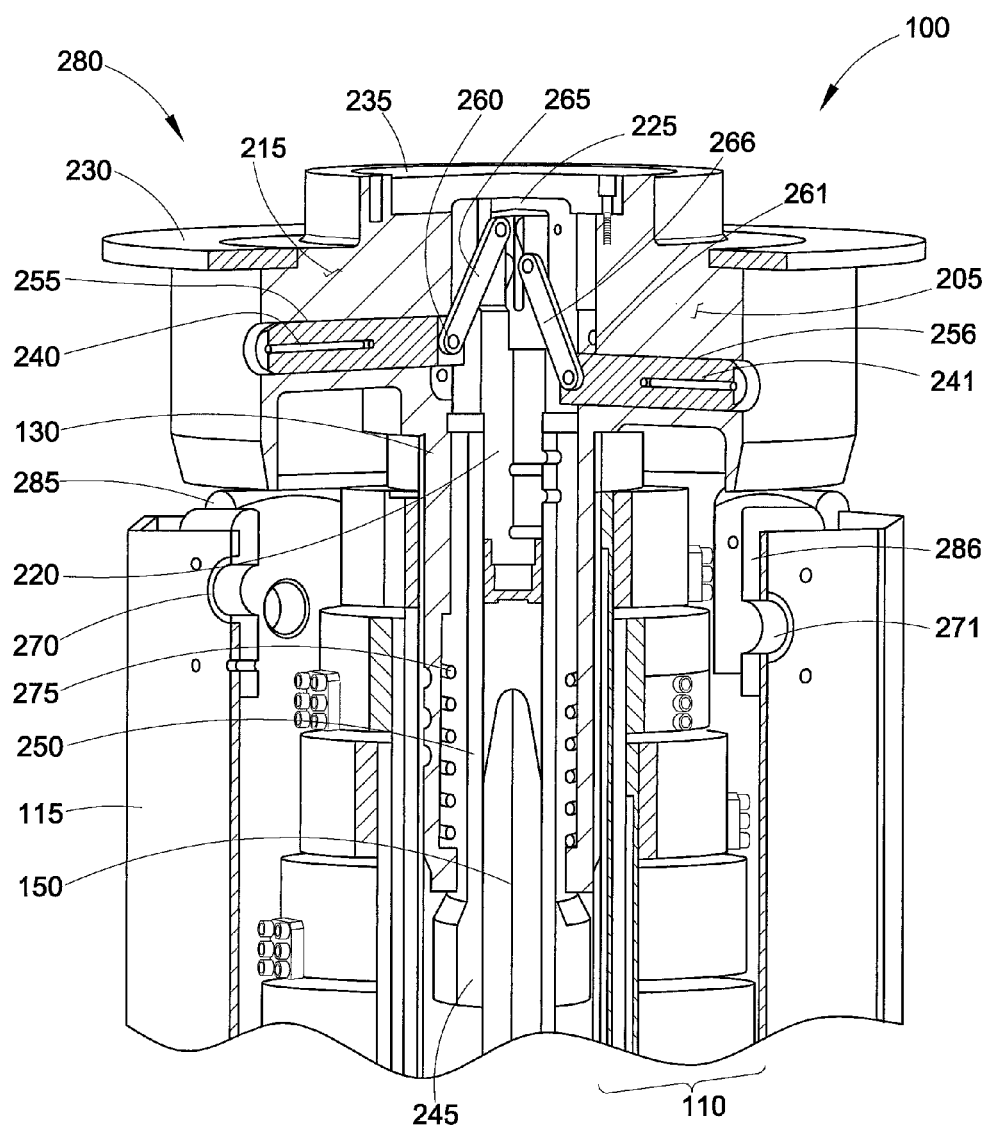
FIG. 6 is a partial exploded perspective cross sectional view of the electric drive screw telescoping mast system in a partially expanded position.

Further rotation of the drive screw 150 in this direction may allow center base nut 170 to engage threads 175 along the bottom of drive screw 150 and extend the center tube 130 and locking sub-assembly 205 from the nesting position 105 to extended position 280 as can be seen in FIG. 6. As the center tube 130 is further extended, the drive screw 150 disengages from threaded nut 245 and carrier adapter 250 to allow the load to be supported by base nut 170.

Also disclosed is a method of locking down an electric drive screw telescoping mast 100. This method comprises the steps of providing a plurality of elongated tubes 115 powered by an elongated drive screw 150. The drive screw 150 is then rotated to retract or expand the plurality of elongated tubes 110 to a nesting position 105. A locking subassembly 220, located on a top end of the plurality of elongated tubes 110, is then positioned on a top rim of a structural envelope 115. The structural envelope 115 substantially surrounds at least a portion of said plurality of elongated tubes 110. The drive screw 150 adapts to a carrier adapter 250 to urge the center hub 220 away from the load bearing top 235. The center hub 220 is located within a cavity 225 of the lock sub-assembly 205 and moveably engaged to at least one locking pin 240, 241 whereby the load bearing top 235 is positioned on the lock sub-assembly 205 opposite the plurality of elongated tubes 110. The locking pins 240, 241 then engage the structural envelope 115 placing the mast assembly 100 in a lock down position 210.

Stated another way, provided is a powerful lock-down mechanism that may be self contained and self powered whereby the existing motion of the telescoping mast is utilized to actuate the locking pins. This mechanism may be adapted to the center tube as the mast assembly telescopingly extends and retracts to conserve space. Additionally, the use of the nesting position allows the drive screw or other mast extension and retraction actuator, to operate the locking pins without moving the elongated tubes.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A lockdown mechanism for a telescoping mast comprising:
 a plurality of elongated tube sections which are telescopingly attached to each other including a center tube, each tube section comprising a substantially hollow body;
 a structural envelope comprising an outermost structural member that remains stationary relative to the plurality of elongated tube sections which are adapted to translate between a lockdown position and an extended position;
 an elongated drive screw adapted to said elongated tube sections and comprising a plurality of threads for extending and retracting said elongated tube sections to any position between the lockdown position and the extended position;
 a lock subassembly including a housing, a center hub, a threaded nut, a carrier adapter and a load bearing top, said lock subassembly being rigidly attached to said center tube and axially aligned to said plurality of elongated tube sections, said carrier adapter comprising an elongated body having a hollow interior adapted for translation of said drive screw, said threaded nut attached to a first side of said carrier adapter to be threadedly engaged by said elongated drive screw, said center hub attached to a second, opposite side of said carrier adapter; and
 at least one locking pin adapted to a first end of a linkage member, wherein said center hub is pinned to a second end of the linkage member and said at least one locking pin is radially extended from the center hub and moveably adapted to engage the structural envelope and said lock subassembly when said mast is in a nesting position;
 wherein as said center hub is moved towards the load bearing top, said locking pin moves away from said structural envelope; and
 wherein as the center hub is moved away from the load bearing top, said locking pin moves toward said structural envelope,
 wherein said center tube comprises:
 a base nut at a first end of said center tube opposite the lock subassembly, said base nut being positioned along a central axis to be threadedly engaged by said drive screw wherein rotation of the drive screw extends or retracts said center tube;
 wherein said linkage member is pivoted via movement of the center hub away or towards the load bearing top in order to extend or retract the at least one locking pin to engage or disengage the structural envelope; wherein when the center hub is translated along the drive screw away from the load bearing top, said at least one locking pin moves toward said structural envelope; and wherein when the center hub is translated along the drive screw towards the load bearing top, said at least one locking pin moves away from said structural envelope.

2. The lockdown mechanism of claim 1 wherein said at least one locking pin engages said lock subassembly and said structural envelope perpendicular to a central axis.

3. The lockdown mechanism of claim 2 further comprising four locking pins.

4. The lockdown mechanism of claim 3 wherein said locking pins are arranged in a common plane.

5. The lockdown mechanism of claim 1 wherein at least one resilient member is provided within said housing to urge said center hub towards said load bearing top.

6. The lockdown mechanism of claim 1 wherein said lock subassembly includes a resilient member to urge said center hub towards said load bearing top.

7. The lockdown mechanism of claim 6 wherein rotation of said drive screw causes said plurality of threads disposed longitudinally along said drive screw to engage said threaded nut at an engagement point and to disengage a base nut at a bottom end of the drive screw, wherein said threaded nut and said drive screw substantially support said center tube until said lock subassembly abuts said structural envelope.

8. The lockdown mechanism of claim 7 wherein said housing abuts said structural envelope at one or more structural inserts.

9. The lockdown mechanism of claim 7 wherein said drive screw rotates and urges said center hub away from said load bearing top after said housing abuts said structural envelope causing said locking pin to moveably engage said structural envelope.

10. The lockdown mechanism of claim 1 wherein a support bracket is adapted to said structural envelope and an associate rigid structure to provide structural support.

11. A lockdown mechanism comprising:
   an elongated drive screw including a plurality of threads for extending and retracting a plurality of elongated tube sections to any position between a lockdown position and an extended position;
   a center tube comprising a base nut at a first end and being attached to a lock subassembly at a second end, said base nut being positioned along a central axis to be threadedly engaged by said elongated drive screw wherein rotation of the drive screw extends or retracts said center tube;
   said lock subassembly including a housing and a center hub having a threaded nut and a carrier adapter, said housing comprising a load bearing top and a hollow cavity, said lock subassembly being rigidly attached to said center tube and axially aligned along a central axis with said elongated drive screw and a structural envelope;
   said carrier adapter comprising an elongated cylindrical body having a hollow interior adapted for translation of said drive screw, said threaded nut attached to a first side of said carrier adapter to be threadedly engaged by said elongated drive screw, said center hub attached to a second, opposite side of said carrier adapter; and
   at least one locking pin adapted to a first end of a linkage member and said center hub is pinned to a second end of the linkage member such that the at least one locking pin is adapted to movably engage said structural envelope;
   wherein said linkage member is pivoted via movement of the center hub away or towards the load bearing top in order to extend or retract the at least one locking pin to engage or disengage the structural envelope; wherein when the center hub is translated along the drive screw away from the load bearing top, said at least one locking pin moves toward said structural envelope; and wherein when the center hub is translated along the drive screw towards the load bearing top, said at least one locking pin moves away from said structural envelope.

12. The lockdown mechanism of claim 11 wherein rotation of said drive screw causes said plurality of threads to engage said threaded nut at an engagement point and to disengage said base nut at a bottom end of the drive screw whereby said threaded nut and said drive screw substantially support said center tube until said lock subassembly abuts said structural envelope.

13. The lockdown mechanism of claim 11 wherein said drive screw rotates and urges said center hub away from said load bearing top after said housing abuts said structural envelope urging said at least one locking pin to moveably engage said structural envelope.

\* \* \* \* \*